INVENTOR.
FRANKLIN C. CHIANG

BY Fraser and Bogucki

ATTORNEYS

June 1, 1965 FRANKLIN C. CHIANG 3,187,305

CHARACTER RECOGNITION SYSTEMS

Filed Oct. 3, 1960 3 Sheets-Sheet 2

INVENTOR.
FRANKLIN C. CHIANG
BY Fraser and Bogucki
ATTORNEYS

INVENTOR.
FRANKLIN C. CHIANG
BY Fraser and Bogucki
ATTORNEYS

United States Patent Office 3,187,305
Patented June 1, 1965

3,187,305

CHARACTER RECOGNITION SYSTEMS

Franklin C. Chiang, Palo Alto, Calif., assignor to International Business Machines Corporation, New York, N.Y., a corporation of New York Filed Oct. 3, 1960, Ser. No. 60,010
7 Claims. (Cl. 340—146.3)

This invention relates to recognition systems, and more particularly to a system for identifying individual ones of a plurality of written or printed characters.

Although many operations and manipulations are now performed automatically by means of mechanized systems, the identification of a particular one of a class of several distinctive items generally requires human recognition. For example, conventional business and scientific records as well as textual materials are usually set forth in printed or written form by means of conventional letters of the alphabet, numerals and symbols each having a unique graphical configuration which the human eye recognizes by interpretation of the distinctive characteristics of each of the characters.

On the other hand, in most data processing systems, information is represented by means of coded electrical signals which in various combinations and permutations are employed to designate discrete characters or symbols comprising numerical, alphabetic or other specially identified information. Accordingly, where information is to be fed into a data processing system, it is common practice to employ a human operator who reads the graphical data and enters the information into the system by means of a keyboard or the like.

Although many systems have been proposed for generating electrical signals derived from a series of unique written or printed characters, each of the known systems suffers from disadvantages in the method and mechanism by which the analysis and recognition of the characters proceeds.

For example, in one known system for character recognition, a signal derived from a character is applied to a tapped delay line which provides a means for electrically examining the waveform of the signal at a given instant when the entire signal is contained in the delay line. By means of taps along the delay line, a number of separate voltages may be derived corresponding to the waveform of the signal in the delay line. By sensing the values of the voltages, the character represented by the waveform is identified.

One of the difficulties encountered in the system described above is that the recognition process must be completed at the precise instant that the entire input signal is contained in the delay line. In contrast, the present invention enables the recognition process to extend for the full period of a input signal, thereby allowing significant simplication in the recognition circuits and an improvement in the accuracy of identifying unknown characters.

In accordance with one aspect of the present invention, a new and improved method for the recognition of characters is provided in which a comparison is made between a signal derived from a character and a plurality of reference signals each representing a specific known character. As a result of the comparison, a difference signal is provided indicating the similarity, or dissimilarity, between the waveform of the input signal and the corresponding reference signal. By sensing the magnitude of the difference signal, the identity of the character may be determined.

In one particular system in accordance with the invention, an unknown character is scanned to provide an input signal, and a tapped delay line is employed as a reference signal generator. By applying a pulse to the delay line at the beginning of the input signal from the unknown character, the pulse proceeds along the delay line and sequentially energizes each of a group of preset signal attenuators one at a time to provide a plurality of sequentially appearing voltages of reference magnitude. Each of the reference voltages is compared, in a serial subtraction circuit, to the input signal, and the difference between the two is accumulated over the time period of the input signal in an integrator. If the integrated difference is below a predetermined threshold level, the character producing the input signal is identified as being identical to the character represented by the reference voltages.

A better understanding of the invention may be had from a reading of the following detailed description and an inspection of the drawings, in which.

Figure 1:
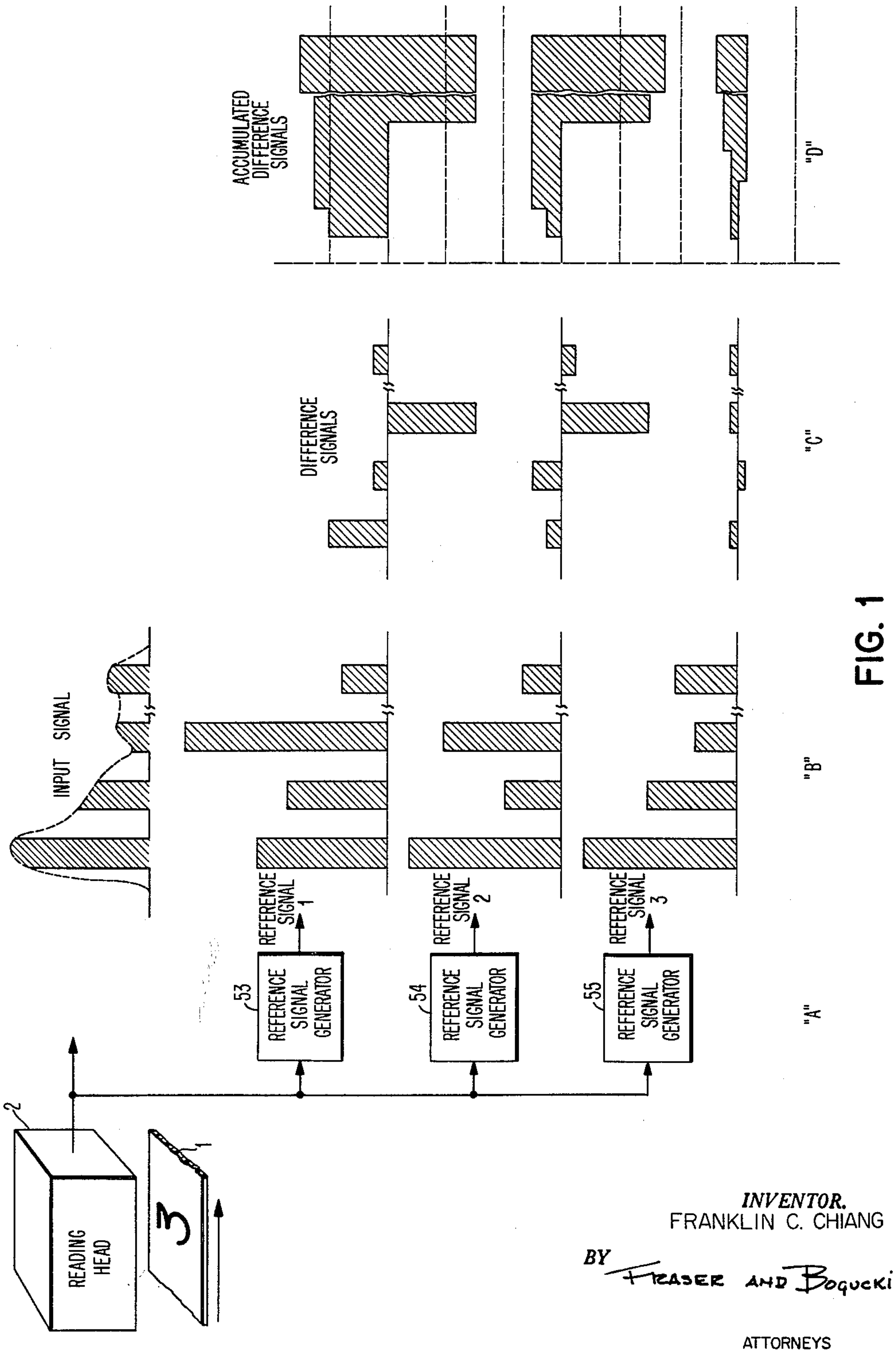
FIG. 1 is a graphical illustration depicting the functional operation of a character recognition system in accordance with the invention.

The functional diagram of FIG. 1 illustrates the manner in which individual ones of a plurality of printed characters may be recognized in accordance with the invention. Each of the steps involved in recognizing a character in accordane with the invention is set forth in FIG. 1 in sequence commencing at the left hand side of the drawing and proceeding to the right. The first step illustrated in section "A" of FIG. 1 is that of scanning a plurality of written characters on a character bearing record 1 by means of a reading head 2 which produces a signal having a waveform corresponding to the configuration of the character to be identified.

By means of signal generators 53–55, a plurality of individual reference signals are generated in synchronism with the waveform from the reading head 2 with each of the reference signals representing a known character. The reference signals are preferably in the form of sequentially appearing pulses having an amplitude characteristic corresponding to the waveform of a known character, as may be seen in section "B" of FIG. 1. By sampling the waveform from the reading head 2 to provide a series of sequentially appearing pulses which are equal in number to the pulses of the reference signals, each of the reference signals may be subtracted from the input signal to produce difference signals as illustrated in section "C" of FIG. 1.

The difference signals may then be accumulated both with respect to positive differences and negative differences as shown in section "D" of FIG. 1, from which it may be seen that the subtraction of a reference signal from an input signal representing the same character as the reference signal produces an accumulated difference signal which is substantially less than in the case of the subtraction of a reference signal and an input signal representing dissimilar characters. By sensing the appearance of a difference signal which falls below a predetermined maximum level, the character being scanned is identified as being the same as that represented by the reference signal. On the other hand where all of the accumulated difference signals exceed a predetermined maximum value or more than one of the difference signals falls below the predetermined value, an ambiguous readout occurs which may be suitably sensed to indicate a lack of positive recognition.

Figure 2:
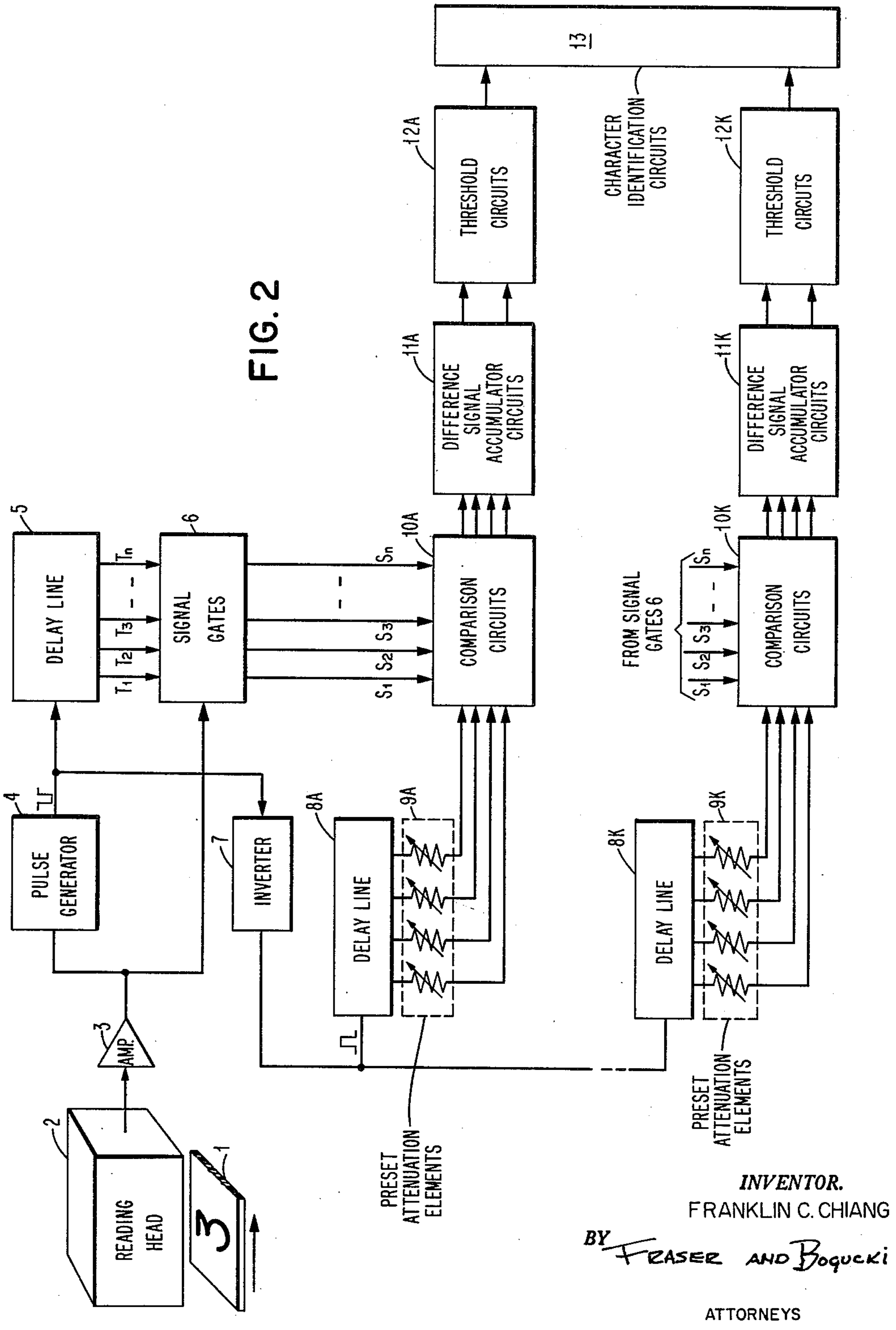
FIG. 2 is a block diagram of one particular character recognition system in accordance with the invention.

The block diagram of FIG. 2 illustrates one suitable system for performing the character recognition functions of FIG. 1. In FIG. 2, characters printed on a record medium 1 are transported past a reading head 2 which functions to generate an electrical signal having a waveform corresponding to the character to be identifield. Where the character appears upon the record medium 1 as a printed or written character, the reading head 2 may comprise a conventional photoelectric cell. In the alternative, the character may be printed on the record medium 1 by means of magnetic ink or the like, with the reading head 2 comprising a magnetic reading head.

The electrical signals from the reading head 2 are amplified by means of an amplifier 3 and applied to a pulse generator 4 which functions to generate a timing pulse in response to the leading edge of each waveform representing a character passing under the reading head 2. The pulse provided by the pulse generator 4 passes down a delay line 5 and appears upon a plurality of connections which are labeled to indicate the successive times at which the pulse appears, e.g., $T_1, T_2, T_3 \ldots T_n$. A plurality of input gates 6 receive the amplified signal from the amplifier 3 and are opened in response to the signals appearing on the lines $T_1, T_2, T_3 \ldots T_n$ in sequence so as to sample or gate the portion of the signal supplied by the reading head 2 at successive intervals in time, whereby samples of the input signals appear successively in time on a plurality of output leads from the input gates 6 designated in FIG. 2 as $S_1, S_2, S_3 \ldots S_n$. In addition to being applied to the delay line 5, the pulse is reversed in polarity by means of an inverter 7 and applied to a series of separate delay lines 8A–8K, one of which corresponds to each character which the system is designed to recognize. The delay lines 8A–8K are each tapped to provide output pulses at the times $T_1, T_2, T_3 \ldots T_n$ corresponding to the times at which the output pulses appear from the delay line 5.

In the arrangement of FIG. 2, reference signals are provided by signal attenuation elements 9A–9K connected to the delay lines 8A–8K which function to pass voltages of reference magnitude corresponding to the amplitude characteristic of a known character. Thus, a plurality of variable resistors may be connected to the taps along the delay line 8A and similarly a plurality of variable resistors may be connected to the delay line 8K. By a suitable adjustment of the variable resistors, a reference signal may be derived comprising a sequence of pulses having an amplitude characteristic corresponding to a known character, i.e., corresponding to the waveform which would be developed if that specific character were passed under the reading head 2 at the scanning speed used for reading. Since the input signals are sampled and converted into pulses at the times $T_1 \ldots T_n$ by the delay line 5 working in conjunction with the input gates 6, a synchronism is achieved between the signals provided by each of the delay lines 8A–8K and the pulses appearing on the output lines $S_1, S_2, S_3 \ldots S_n$ from the input gates 6.

By means of a plurality of comparison circuits 10A–10K each of the pulses passed by the input gates 6 may be compared with a corresponding reference pulse appearing on a lead from the delay lines 8A–8K so as to derive difference signals which represent the difference between the input signal waveform at a given time increment and a corresponding reference signal pulse.

Where the reference signal pulse is equal in amplitude to the sample of the waveform, the signal appearing at the output of the comparison is negligible. However, where the sampled waveform signal on the leads $S_1 \ldots S_n$ is either greater or less than a corresponding reference signal pulse, the comparison circuit provides an output signal corresponding to the degree and sense of the difference.

Each of the comparison circuits 10A–10K corresponds to one given reference character and the overall difference between the sequence of reference pulses and the sequence of samples of the input waveform may be combined in the difference signal accumulator circuits 11A–11K from which both positive and negative differences are accumulated over the time interval of the waveform supplied by the reading head 2. As noted previously in connection with FIG. 1, where the amplitude of the accumulated difference signals does not exceed a predetermined threshold, either positively or negatively, the character being scanned and its resulting waveform may be identified as the character represented by the reference signal pulses. Thus, where the accumulated difference signals from the circuits 11A–11K of FIG. 2 are such that only one such signal is below a predetermined level, the character being scanned is identified as corresponding to that represented by a particular set of reference signal pulses. In order to determine whether or not any one of the output signals from the circuits 11A–11K falls below an established predetermined level, the accumulated difference signals from the circuits 11A–11K are applied to threshold circuits 12A–12K which each function to generate an output signal whenever the signal from a corresponding difference signal accumulator cicuit rises above the predetermined threshold level. The output signals from the threshold circuits 12 may be applied to suitable logical circuits 13 for character identification which function to recognize the character by sensing the appearance and lack of appearance of signals from the threshold circuits 12A–12K. The character identification circuits 13 may be connected to a suitable register or input device in a data processing system so that in overall operation the character recognition system of the invention provides a device for automatically reading and recognizing a series of written or printed characters for introduction into a data processing system such as a digital computer.

It will be appreciated that under adverse conditions of operation, the output signals from the difference signal accumulator circuits 11A–11K may be such that more than one accumulated difference signal falls below the established threshold level or in the alternative, none of the accumulated difference signals may fall below the threshold level. Under such conditions, an ambiguous readout is indicated and by means of suitable logical circuitry included in the character identification circuits 13, an alarm may be sounded or an error signal generated whenever an ambiguous readout occurs. By this means, the arrangement of FIG. 2 may be made to provide a positive character recognition.

Figure 3:
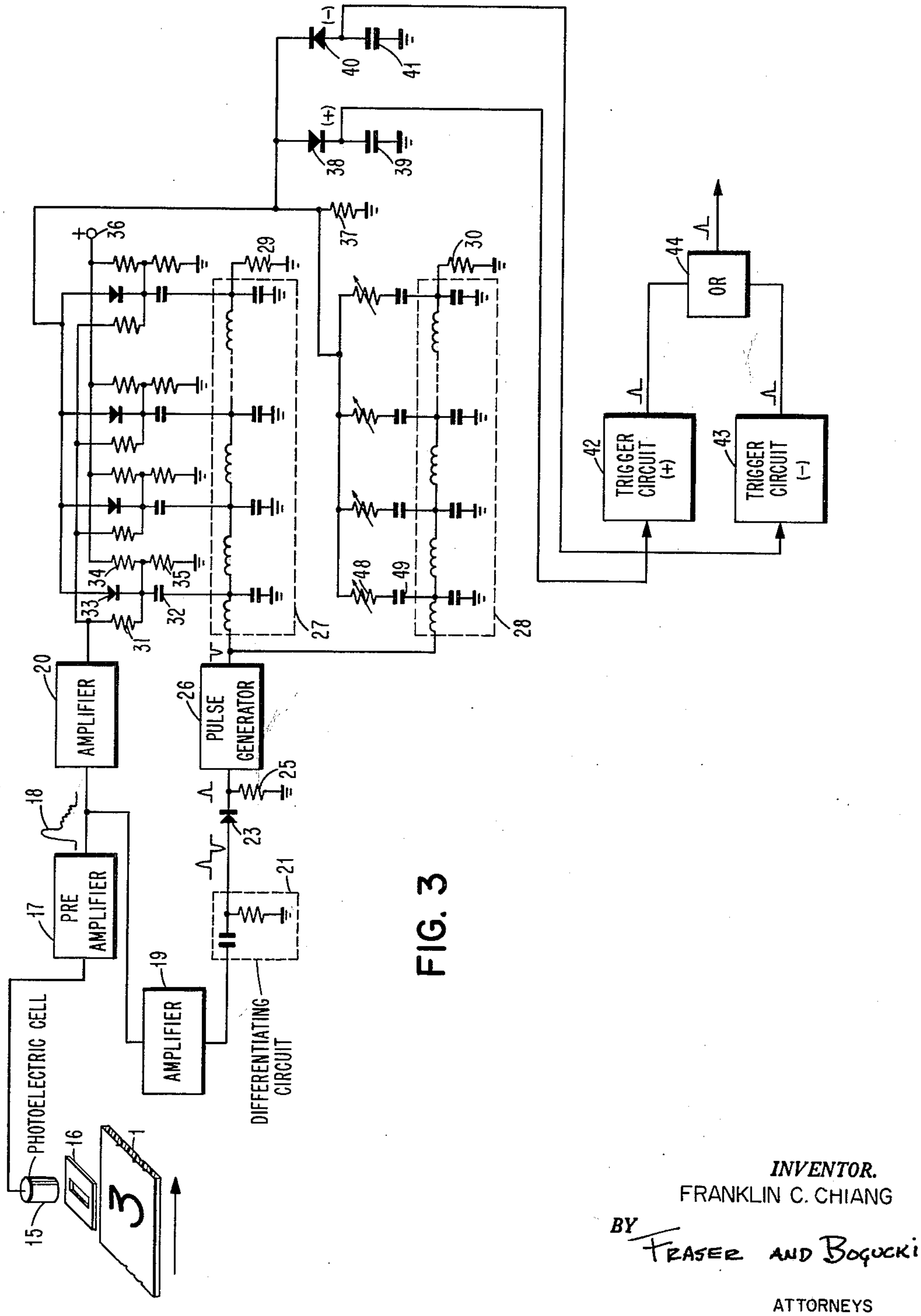
FIG. 3 is a combined block and schematic circuit diagram depicting in detail various specific circuit arrangements for use in the character recognition system of FIG. 2.

In FIG. 3 of the drawings there is illustrated in somewhat greater detail a system for recognizing written characters in accordance with the invention. In FIG. 3, as described previously, printed characters on a suitable supporting medium 1 may be swept past a reading head comprising a photoelectric cell 15 and an apertured plate 16. As a character on the sheet 1 passes beneath the apertured plate 16, the photoelectric cell 15 functions to generate an electrical signal in accordance with the amount of light reflected from the sheet 1 through the slit 16. As a result, each successive character on the sheet 1 is scanned to produce a characteristic waveform which is applied to a preamplifier 17.

The output signal from the preamplifier 17 may typically follow a waveform such as that illustrated at 18 and is applied to the amplifiers 19 and 20. The amplified signal from the amplifier 19 is applied to a differentiating circuit 21 which functions to generate alternate going pulses coinciding with the leading and lagging edges of the waveform produced by each individual character. Since only the pulse coinciding with the leading edge of the waveform is of interest for the purpose of synchronizing the operation of apparatus in accordance with the invention, the alternate positive and negative pulses from the differentiating circuit 21 are applied to a diode 23 which conducts only the pulses identifying the leading edge of each waveform so that the selected pulses appear across a resistor 25 and are applied to a pulse generator 26 which generates a suitable negative going pulse for application to the delay lines 27 and 28.

Each of the delay lines 27 and 28 comprises a multiple section transmission line constructed of either tapped or individual inductances and capacitors which function together to propagate the applied pulses along the length of the transmission line so as to appear at each successive section in time sequence. By selecting like circuit values for the components of the delay lines 27 and 28, pulses may be derived from corresponding taps of the delay lines 27 and 28 which are synchronized with respect to one another. Each of the delay lines 27 and 28 may be terminated at a suitable terminating resistor 29 and 30 as shown.

The delay line 27 functions to generate pulses which operate to sample the waveform passed by the amplifier 20. For this purpose, the signal from the amplifier 20 is applied to a plurality of separate gate circuits, one of which corresponds to each tap along the delay line 27. The gate circuits may be identical to one another and may each consist of an isolating resistor 31, a coupling capacitor 32, a diode 33 and two biasing resistors 34 and 35. In operation, the diode 33 is biased in a reverse direction by applying a voltage to a terminal 36 which appears across a voltage divider formed by the resistors 34 and 35. As the pulse from the pulse generator 26 is propagated along the length of the delay line 27, the pulse is successively applied to each individual gate circuit in turn, as for example, via the capacitor 32. The applied pulse renders the diode 33 conducting to a degree determined by the voltage applied to the gating circuit via the isolating resistor 31 so that there appears across the load resistor 37 a pulse having an amplitude corresponding to the waveform from the photoelectric cell 15 at the time of the occurrence of the sampling pulse. Thus, a series of pulses are supplied by the gating circuit as the timing pulse is propagated along the length of the delay line 27 each having an amplitude corresponding to the waveform of a character being scanned.

At the same time, the pulse from the pulse generator 26 is propagated along the length of the delay line 28 appearing at each successive tap at a time which is coincident with the time at which the pulse appears at a corresponding tap along the delay line 27. The successively appearing pulses from the delay line 28 are applied to suitable reference signal generating circuits as for example, variable resistors 48 connected serially with coupling capacitors 49. By a suitable preset adjustment of the variable resistors, the pulses propagated along the length of the delay line 28 may be caused to generate a sequence of reference voltages each having a magnitude corresponding to that of a waveform representing a known character. The reference voltages passed by the variable resistors are applied to the resistor 37 in a direction which is subtractive with respect to the pulses representing sample portions of the unknown waveform. Therefore, if a given reference voltage pulse is equal in magnitude to a given sample of the waveform, the net voltage across the resistor 37 is zero. However, a difference signal appears across the resistor 37 whenever the sample of the waveform departs from the reference voltage magnitude. Accordingly, as the timing pulse is propagated along the delay lines 27 and 28 a series of difference signals may appear across the resistor 37 of either positive or negative polarity corresponding to the difference between the individual samples of the waveform and the individual reference signal pulses. The series of difference signals appearing across the resistor 37 is applied to difference signal accumulator circuits which function to integrate both positive and negative difference signals. For this purpose, a diode 38 is connected serially with a capacitor 39 to accumulate positive difference signals while an oppositely poled diode 40 is connected serially with a capacitor 41 for the purpose of accumuluating negative difference signals. Thus, as a series of difference signals appear, the voltages across the capacitors 39 and 41 correspond to the degree of difference between the reference signal pulses and the samples of the waveform both as to positive differences and negative differences.

As described above, where the reference signal pulses correspond in magnitude to a simple waveform, the accumulated difference signals fall below a predetermined threshold level. In order to ascertain whether or not the accumulated difference signals supplied by the capacitors 39 and 41 rise above the predetermined threshold level, two separate trigger circuits 42 and 43 may be connected to receive the signals from the capacitors 39 and 41. Each of the trigger circuits 42 and 43 may comprise a conventional Schmitt trigger circuit which functions to provide an output signal whenever an applied input signal rises above a predetermined threshold level. In the case of the trigger circuit 42, the circuit should be selected so that an output signal appears whenever the input signal rises above a predetermined positive threshold level while in the case of the trigger circuit 43 a negative threshold level is utilized. Thus, whenever the voltage across either the capacitor 39 or the capacitor 41 or both the capacitor 39 and 41 rises above a predetermined threshold level, the trigger circuits 42 and 43 provide an output signal.

The output signals from the trigger circuits 42 and 43 may be applied to a logical OR circuit 44 so as to be combined on a single output lead upon which the appearance of an output signal indicates that the scanned character does not correspond to the character represented by the reference signal pulses established by the setting of the variable resistors 48. By comparing the sampled signals with a number of separate sets of reference signal pulses, the identity of a particular character being scanned may be readily ascertained by observing whether or not output signals appear on the output leads from each of the several threshold circuits. As indicated in FIG. 2, the signals may be applied to suitable logical circuitry for providing digital output signals which may be applied to a register or the like in the data processing system into which the value of the scanned character may be entered.

Although in the above description of FIGS. 2 and 3, individual delay lines have been employed for the generation of a succession of electrical pulses, it will be appreciated that other arrangements may be used as well. For example, the circuit may be simplified by employing a single delay line from which both signal sampling and reference signal pulses are derived. Furthermore, other types of signal commutation equipment, either mechanical or electrical, may be readily substituted for the delay lines.

By means of the above described method and apparatus for identifying unknown characters, there is provided a simple system by means of which a positive identification of a scanned character may be obtained. Through a suitable adjustment of the threshold circuits a degree of tolerance may be established in the system for variations in the scanned characters so as to overcome the problem of defects in printing or variations in handwritten numerals and the like.

The above described specific methods and apparatus for practicing the present invention are intended to be by way of example only of the manner in which the invention may be used to advantage. Accordingly, any and all variations, alternative methods or arrangements and modifications falling within the scope of the annexed claims should be considered to be a part of the invention.

What is claimed is:

1. A character recognition circuit including the combination of scanning means generating an electrical signal having a waveform representing a character to be identified, a timing signal generator coupled to said scanning means for providing an electrical signal which is synchronized in time with respect to the waveform of an electrical signal provided by the scanning means, sampling means coupled between said scanning means and said timing signal generator for passing a portion of the electrical signals generated by said scanning means at predetermined times, reference signal generating means coupled to said timing signal generator for providing reference signals having amplitude characteristics corresponding to the waveform produced by scanning a known character, signal comparison means coupled between said sampling means and said reference signal generating means for providing an output signal corresponding to the difference in amplitude between the waveform of the signal provided by said scanning means and the amplitude of the reference signals supplied by the reference signal generating means, and means responsive to the output signal from said comparison means for identifying the character being scanned whenever the degree of difference between the waveform of the signal provided by the scanning means and the reference signals provided by said reference signal generating means falls below a predetermined level.

2. A character recognition circuit including the combination of scanning means generating an electrical signal having a continuous amplitude varying waveform representing a character to be identified, a timing signal generator coupled to said scanning means for providing an electrical signal which is synchronized in time with respect to the waveform of an electrical signal provided by the scanning means, sampling means coupled between said scanning means and said timing signal generator for passing a portion of the electrical signals generated by said scanning means at predetermined times, reference signal generating means coupled to said timing signal generator for providing reference signals having amplitude characteristics corresponding to the waveform generated by the scanning of a known character, signal comparison means coupled between said sampling means and said reference signal generating means for providing a difference signal corresponding to the difference in amplitude between the waveform of the signal provided by said scanning means and the amplitude of the reference signals supplied by the reference signal generating means, an accumulator coupled to the signal comparison means for providing an output signal corresponding to the degree of difference between the amplitude characteristic of the waveform provided by the scanning means and the reference signals provided by the reference signal generating means, and means responsive to the output signal from said accumulator for identifying the character being scanned whenever the degree of difference between the waveform of the electrical signal provided by the scanning means and the reference signals provided by said reference signal generating means falls below a predetermined level.

3. A character recognition circuit including the combination of scanning means for generating an electrical signal having a waveform representing a character to be identified, a timing signal generator coupled to said scanning means for providing an electrical signal which is synchronized in tme wth respect to the waveform of an electrical signal provided by the scanning means, a first delay line coupled to said timing signal generator having a plurality of connections at which the electrical signal from the timing signal generator appears sequentially in time, a plurality of gates individually connected between the connections to said first delay line and said scanning means for passing a portion of the electrical signals generated by said scanning means at times corresponding to the times at which said timing signal appears at each of the electrical connections along said first delay line, a second delay line coupled to the timing signal generator having a plurality of connections along which a signal provided by said timing signal generator appears sequentially in time, reference signal generating means coupled to the connections of said second delay line for providing reference signals having amplitude characteristics corresponding to the waveform generated by the scanning of a known character, and signal comparison means coupled between said reference signal generating means and said gates for providing an output signal corresponding to the difference in amplitude between the waveform of the signal provided by said scanning means and the amplitude of the reference signals supplied by the reference signal generating means, whereby the signal from said comparison means functions to identify the character being scanned whenever the degree of difference between the waveform of the signal provided by the scanning means and the signals provided by said reference amplitude of the output signal generating means falls below a predetermined level.

4. A character recognition circuit including the combination of scanning means for generating an electrical signal having a waveform representing a character to be identified, a timing signal generator coupled to said scanning means for providing an electrical signal which is synchronized in time with respect to the waveform of an electrical signal provided by the scanning means, a first delay line coupled to said timing signal generator having a plurality of connections at which the electrical signal from the timing signal generator appears sequentially in time, a plurality of gates individually connected between the connections to said first delay line and said scanning means for passing a portion of the electrical signals generated by said scanning means at times corresponding to the times at which said timing signal appears at each of the electrical connections along said first delay line, a second delay line coupled to the timing signal generator having a plurality of connections along which a signal provided by said timing signal generator appears sequentially in time, signal attenuation means coupled to the connections of said second delay line for providing reference signals having amplitude characteristics corresponding to the waveform produced by the scanning of a known character, signal comparison means coupled between said attenuation means and said gates for providing a difference signal corresponding to the difference in amplitude between the waveform of the signal provided by said scanning means and the amplitude of the reference signals supplied by the attenuation means, and an accumulator coupled to the signal comparison means for providing an output signal corresponding to the degree of difference between the amplitude characteristic of the waveform provided by the scanning means and the signals provided by the attenuation means, whereby the signal from said accumulator functions to identify the character being scanned whenever the degree of difference between the waveform of the electrical signal provided by the scanning means and the signals provided by said attenuation means falls below a predetermined level.

5. A character recognition system including the combination of scanning means for providing an electrical signal having a waveform corresponding to a character to be identified, means for generating a sequentially appearing reference signal synchronized with the waveform from said scanning means and having an amplitude characteristic corresponding to the waveform produced by scanning of a known character, comparison means coupled between said scanning means and said reference signal generating means for providing a difference signal representing the difference between the amplitude characteristic of the waveform provided by the scanning means and the reference signal from said reference signal generating means, an accumulator coupled to said comparison means for providing a signal corresponding to the accumulated difference between the waveform of the reference signals over the time interval of the waveform, and means coupled to said accumulator for sensing the identity of said character being scanned in accordance with the magnitude of the accumulated difference signal from said accumulator.

6. A character recognition system including the combination of means scanning a character to be identified, a plurality of gates coupled to said scanning means, means for sequentially energizing said gates to pass a portion of the signal from said scanning means, means for generating a sequentially appearing electrical signal having an amplitude characteristic corresponding to the waveform produced by scanning a known character, comparison means coupled between said plurality of gates and said sequential signal generator for providing a signal corresponding to the accumulated differences between the sequentially appearing electrical signals and a signal from said scanning means, and means coupled to said comparison means for sensing the identity of a character being scanned in accordance with the accumulated difference signal.

7. A character recognition system including the combination of means scanning a character to be identified, a plurality of gates coupled to said scanning means, means for sequentially energizing said gates to pass a portion of the signal from said scanning means, means for generating a sequentially appearing electrical signal having an amplitude characteristic corresponding to a signal produced by scanning of a known character, signal comparison means coupled between said plurality of gates and said sequential signal generator for providing a signal corresponding to the amplitude difference between the sequentially appearing electrical signals and a signal from said scanning means, an accumulator coupled to said comparison means for providing a signal representing the accumulated difference signal over the time interval of the signal from said scanning means, and means coupled to said accumulator for sensing the identity of a character being scanned in accordance with the magnitude of said accumulated difference signal.

References Cited by the Examiner

UNITED STATES PATENTS

| | | | |
|---|---|---|---|
| 2,894,247 | 7/59 | Relis | 340—149 |
| 2,927,303 | 3/60 | Elbinger | 340—149 |
| 2,968,789 | 1/61 | Weiss et al. | 340—149 |
| 2,995,727 | 8/61 | Quade | 340—146.3 |

MALCOLM A. MORRISON, *Primary Examiner.*

IRVING L. SRAGOW, *Examiner.*

UNITED STATES PATENT OFFICE

CERTIFICATE OF CORRECTION

Patent No. 3,187,305 June 1, 1965

Franklin C. Chiang

It is hereby certified that error appears in the above numbered patent requiring correction and that the said Letters Patent should read as corrected below.

Column 2, line 28, for "accordane" read -- accordance --; column 5, line 70, for "accumuluating" read -- accumulating -- column 6, line 2, for "simple" read -- sample --; column 7, li 54, for "tme wth" read -- time with --; column 8, line 7, strike out "amplitude of the output" and insert the same afte "the", second occurrence, in line 42, same column 8.

Signed and sealed this 26th day of October 1965.

(SEAL)
Attest:

ERNEST W. SWIDER
Attesting Officer

EDWARD J. BRENNER
Commissioner of Patents